United States Patent [19]

Yamamoto

[11] Patent Number: 4,926,794
[45] Date of Patent: May 22, 1990

[54] DOMESTIC PETS' CHAMBERPOT

[76] Inventor: Yoshikazu Yamamoto, 1-1, 3-chome, Eganosho, Habikino-shi, Osaka, Japan

[21] Appl. No.: 329,657

[22] Filed: Mar. 28, 1989

[51] Int. Cl.⁵ .............................................. A01K 29/00
[52] U.S. Cl. ........................................................ 119/1
[58] Field of Search ........................................... 119/1

[56] References Cited

U.S. PATENT DOCUMENTS

| | | | |
|---|---|---|---|
| 3,310,031 | 6/1965 | Lowe, Jr. | 119/1 |
| 3,793,989 | 2/1974 | Clark | 119/1 |
| 3,831,557 | 8/1974 | Elesh | 119/1 |
| 3,872,832 | 3/1975 | Quinn | 119/1 |
| 3,990,396 | 11/1976 | Turk | 119/1 |
| 4,335,679 | 6/1982 | Carlin | 119/1 |
| 4,517,920 | 5/1985 | Yamamoto | 119/1 |

FOREIGN PATENT DOCUMENTS

| | | | |
|---|---|---|---|
| 0259293 | 3/1988 | European Pat. Off. | 119/1 |
| 2509125 | 9/1976 | Fed. Rep. of Germany | 119/1 |
| 2419015 | 11/1979 | France | 119/1 |
| 2482416 | 11/1981 | France | 119/1 |

*Primary Examiner*—Robert P. Swiatek
*Assistant Examiner*—T. Manahan
*Attorney, Agent, or Firm*—Moonray Kojima

[57] ABSTRACT

This invention is concerned with a chamberpot for domestic pets such as cats. The chamberpot allows sand to be removed therefrom with ease, and cleaning work to be done in a simple manner. The chamberpot is constructed to receive a scoop to enable pet keepers to dispose of their pets' excrement without dirtying their hands.

2 Claims, 2 Drawing Sheets

DOMESTIC PETS' CHAMBERPOT

DESCRIPTION OF THE PRIOR ART

As disclosed in U.S. Pat. No. 4,517,920 granted to Applicant hereof, for example, a domestic pets' chamberpot in general use comprises a lower frame, and and an upper frame including an upstanding peripheral wall and connected to the lower frame. The upper frame has a net bottom for receiving sand or the like.

Domestic pets, notably cats, have a habit of covering their excrement with sand. In order to prevent the sand from being scattered out of the chamberpot when the cats do so, the chamberpot includes a sand stopper guard curved inwardly from a top edge thereof.

The pets' chamberpot usually is turned upside down for removing the sand from inside. At this time, however, since the chamberpot includes a sand stopper guard as noted above, part of the sand inevitably becomes caught behind the sand stopper guard. The sand is completely removable only by by repeating the same action or by shaking the chamberpot hard to and fro. It is thus impossible to remove the sand smoothly.

In addition, when cleaning the chamberpot, it is difficult to extend a cleaning device to positions behind the sand stopper guard, which impedes satisfactory cleaning work.

OBJECTS OF THE INVENTION

A primary object of the present invention is to provide a domestic pets'0 chamber pot which facilitates removal of sand therefrom. To achieve this object, a chamberpot comprises a sand stopper guard removably mounted on a main frame and including an inwardly extending sand stopper jaw formed integral therewith. The sand stopper guard may be detached for changing sand placed in the chamberpot, whereby the sand is removed smoothly without becoming caught.

The inside of the chamberpot may be cleaned with ease after detaching the sand stopper guard. The sand stopper guard itself may be washed separately.

Another object of the present invention is to provide a chamberpot which is easy to assemble and disassemble. This object is achieved by a snap fit between engaging projections formed on the sand stopper guard and engaging bores formed in the main frame. Thus, the sand stopper guard is readily attachable to and detachable from the main frame.

A further object of the invention is to facilitate disposal of pets' excrement. To achieve this object, the chamberpot defines a scoop receiving bore in one corner of the the sand stopper guard. Thus, a scoop may be made available as mounted in the chamberpot at all times, for use in disposal of excrement as necessary.

A still further object of the invention is to counteract the offensive smell of pets' excrement. This object is achieved by providing a holder formed on an inside surface of one of the peripheral walls for receiving a deodorizing or aromatic agent which eliminates or mitigates the smell.

BRIEF DESCRIPTION OF THE DRAWINGS

The drawings show an embodiment of the present invention, in which.

DETAILED DESCRIPTION OF THE PREFERRED EMBODIMENT

An embodiment of the present invention will be described in detail hereinafter with reference to the drawings.

Figure 1:
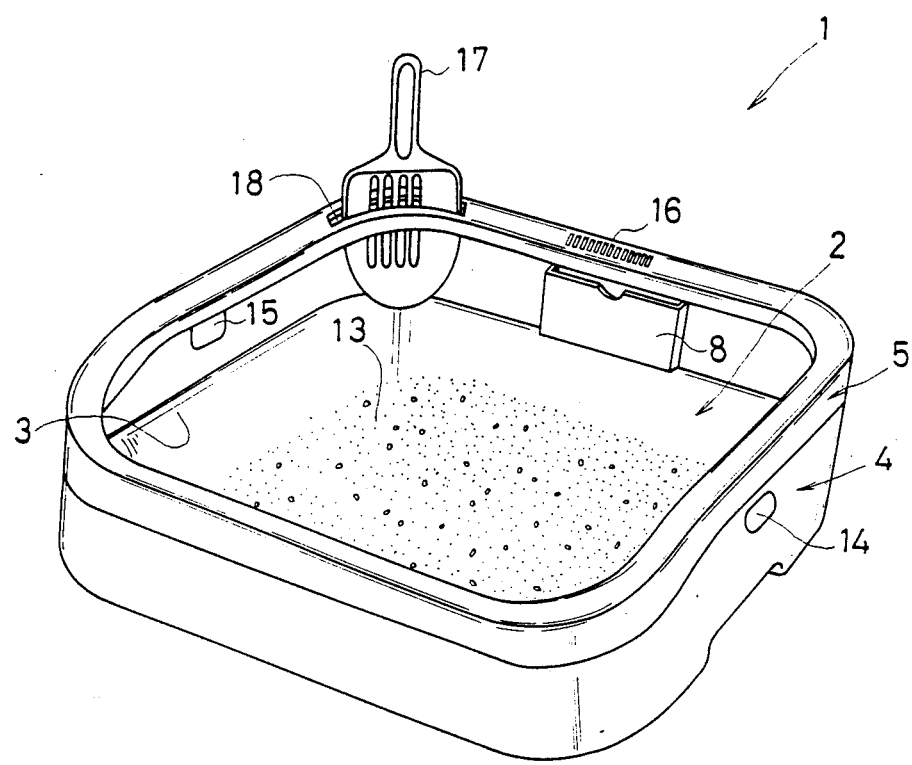
FIG. 1 is a perspective view of a cats' chamberpot.

As shown in FIG. 1, a domestic cats' chamberpot 1 comprises a main frame 4 including peripheral walls 3 surrounding a square sand bed 2 on which sand is placed, and a sand stopper guard 5 removably mounted on the main frame 4.

One side wall 6 of the main frame 4 has a slightly less height than the other walls to allow a cat to enter and exit the chamberpot 1 with ease. The opposite side wall 7 includes an open-top holder 8 formed integrally with an inside surface thereof to receive a deodorizer or an aromatic agent for counteracting the offensive smell of excrement. The remaining two side walls 9 each define an elliptical engaging bore 10 necessary for attaching the sand stopper guard 5 to the main frame 4.

Figure 3:
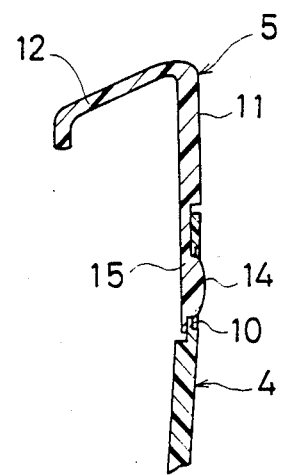
FIG. 3 is a sectional view of a sand stopper guard attaching portion of the chamberpot.
Figure 2:
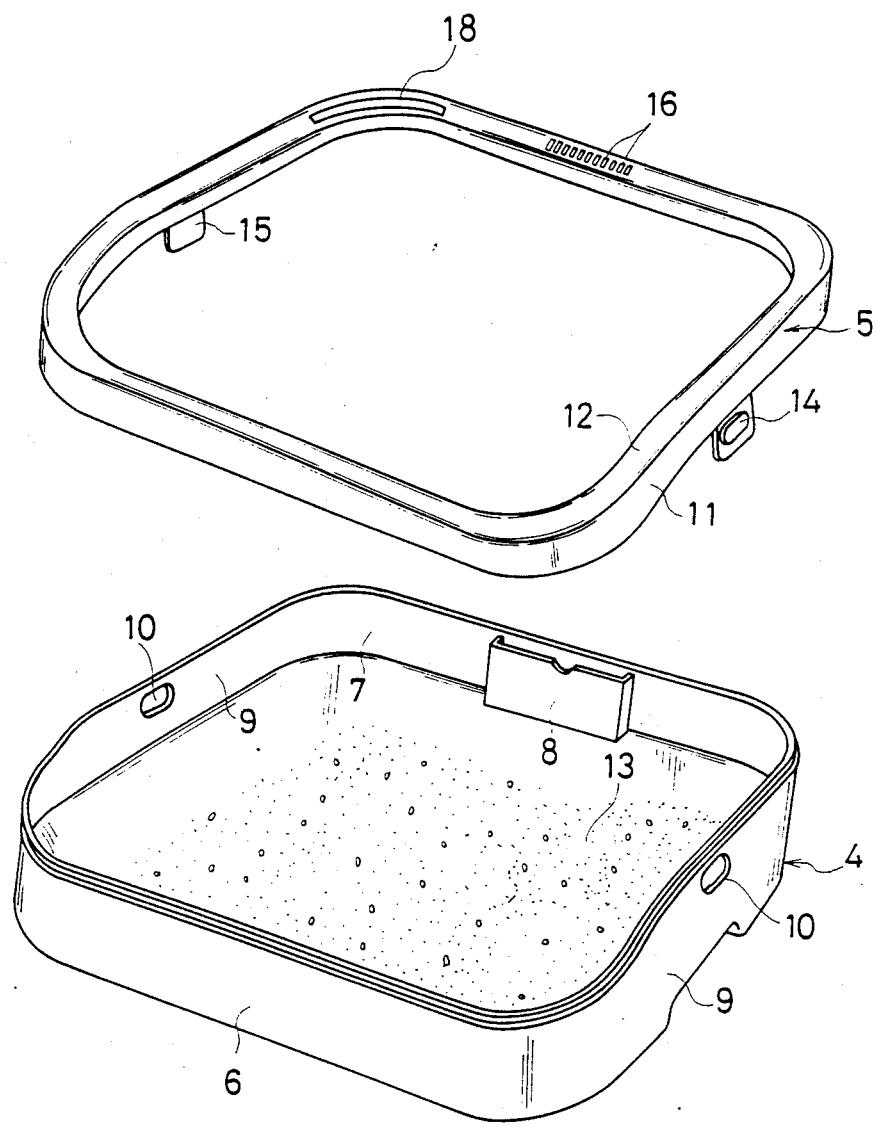
FIG. 2 is a perspective view of the chamberpot as disassembled.

The sand stopper guard 5 includes outer walls 11 whose lower ends follow the shape of top edges of the peripheral walls 3 of the main frame 4 for tight fit onto the peripheral walls 3. The outer walls 11 of the sand stopper guard 5 each define a top edge bent inwardly to form a sand stopper jaw 12 having an approximately inverted V-shape section as shown in FIG. 3. The sand stopper jaw 12 prevents the sand 13 placed on the sand bed 2 from being scattered outwardly when the cat, by habit, covers its excrement with the sand.

The two opposed outer walls 11 of the sand stopper guard 5 each define an engaging tab 15 including an elliptical engaging projection 14 for fitting into the associated engaging bore 10 mentioned above.

Further, the sand stopper guard 5 defines a plurality of elongate vents 16 in a top surface thereof opposed to the holder 8. A curved corner of the stopper guard 5 adjacent the vents 16 is bored in a correspondingly curved shape to define a scoop receiver 18 for receiving a scoop 17 which is used to place or otherwise handle the sand on the sand bed 2.

With the cats' chamberpot 1 as constructed above, the main frame 4 and sand stopper guard 4 are separated when removing the sand or cleaning the chamberpot.

The separation is carried out simply by inwardly pressing the engaging projections 14 positioned in the two opposite side walls 9. Then the engaging projections 14 are released from the engaging bores 10 to render the sand stopper guard 5 removable from the main frame 4 of the chamberpot 1.

The main frame 4 may just be turned upside down for removing the sand 13 placed on the sand bed 2. The sand is smoothly removed since this chamberpot does not include a sand stopper guard integral with the main frame, in which the sand would become caught as experienced in the prior art when the chamberpot is turned upside down.

When cleaning the chamberpot, the back surfaces of the sand stopper guard 5 may be completely cleaned now that the main frame 4 and the sand stopper guard 5 are separated. As noted hereinbefore, it has been difficult to extend a cleaning device to the back surfaces of the guard according to the prior art.

The engaging projections 14 and engaging bores 10 are engageable through their material elasticity. The two members are thus not only readily separable as noted above, but may be engaged simply by placing the sand stopper guard 5 on the main frame 4 and applying a sight downward pressure thereto.

The removable sand stopper guard 5 permits the holder 8 for receiving a deodorizer or an aromatic agent to be disposed inside a side wall of the main frame 4.

Consequently, the cats' chamberpot according to the present invention does not require a lid mounted on an outer side wall which is opened for placing the above chemical agent. Not only does this chamberpot not have the problem of the cat playing with and opening the lid, but it simplifies the manufacturing process and has a presentable outer appearance.

What is claimed is:

1. An animal toilet comprising:
   a base structure having a level horizontal bottom surface and four substantially vertical peripheral walls extending upwardly from said bottom surface, one of said peripheral walls having a shorter height than the other peripheral walls;
   a removable guard device mounted on top of said peripheral walls opposite said bottom surface, said guard device having four outer wall portions corresponding to and fitted to said peripheral walls and inwardly directed jaw portions extending from said outer wall portions and overhanging an area above said bottom surface so as to prevent material held within said base structure from being thrown out of said animal toilet;
   engaging bores extending through at least two of said peripheral walls and disposed toward the top thereof, said at least two peripheral walls located opposite each other;
   engaging projections extending from at least two of said outer wall portions corresponding to said engaging bores in said at least two peripheral walls away from said jaw portions, said engaging projections having dimensions so as to engage within and extend through said engaging bores to a position outside of said area above said bottom surface presenting a substantially flush surface with said at least two peripheral walls so that said guard device is locked to said base structure when said engaging projections are engaged within said engaging bores and said guard device is unlocked from said base structure when, by the application of manual pressure directed against said engaging projections inwardly toward said area above said bottom surface, said engaging projections are moved out of said engaging bores and the guard device is thereby removed from said base structure; and
   a holder means for receiving a deodorizer/aromatic agent on an inner surface of one of said peripheral walls, said guard device further having an opening in the jaw portion thereof such that when said guard device is locked to said base structure, the opening is disposed above said holder means so as to permit the deodorizer/aromatic agent to exit therethrough.

2. The animal toilet of claim 1, wherein said guard device has another opening in the jaw portion at the intersection of two of said outer wall portions for holding a scoop.

* * * * *